US012782378B2

(12) United States Patent
Hayakawa et al.

(10) Patent No.: US 12,782,378 B2
(45) Date of Patent: Nov. 3, 2026

(54) PROCESSING SYSTEM, MARKING METHOD, MARKER DETECTED IN SAID METHOD, AND MARKING PROGRAM

(71) Applicant: The University of Tokyo, Tokyo (JP)

(72) Inventors: Tomohiko Hayakawa, Tokyo (JP); Masatoshi Ishikawa, Tokyo (JP); Haruka Ikeda, Tokyo (JP)

(73) Assignee: The University of Tokyo, Tokyo (JP)

( * ) Notice: Subject to any disclaimer, the term of this patent is extended or adjusted under 35 U.S.C. 154(b) by 1321 days.

(21) Appl. No.: 17/629,241

(22) PCT Filed: Jul. 15, 2020

(86) PCT No.: PCT/JP2020/027575
§ 371 (c)(1),
(2) Date: Mar. 16, 2022

(87) PCT Pub. No.: WO2021/015077
PCT Pub. Date: Jan. 28, 2021

(65) Prior Publication Data

US 2022/0252633 A1 Aug. 11, 2022

(30) Foreign Application Priority Data

Jul. 22, 2019 (JP) ................................ 2019-134851

(51) Int. Cl.
*G01F 3/38* (2006.01)
*G01P 3/38* (2006.01)
(Continued)

(52) U.S. Cl.
CPC .................. *G01P 3/38* (2013.01); *G06T 7/20* (2013.01); *G06T 7/97* (2017.01); *G06T 2207/30204* (2013.01)

(58) Field of Classification Search
CPC . G01P 3/38; G06T 2207/30204; G06T 7/246; G01B 11/00
See application file for complete search history.

(56) References Cited

U.S. PATENT DOCUMENTS 4,341,957 A * 7/1982 Wieder .............. G01N 21/6408 250/365
6,399,397 B1 * 6/2002 Zarling ................ G01N 33/588 436/805
(Continued)

FOREIGN PATENT DOCUMENTS

CN 108883299 A 11/2018
JP H05505788 A 8/1993
(Continued)

OTHER PUBLICATIONS

Yilmaz et al., "Object Tracking: A Survey" ACM Computing Surveys, vol. 38, No. 4, Article 13, Publication date: Dec. 2006.

*Primary Examiner* — Michelle M Iacoletti
*Assistant Examiner* — Mohamed Doumbia
(74) *Attorney, Agent, or Firm* — PROCOPIO, CORY, HARGREAVES & SAVITCH LLP

(57) ABSTRACT

A processing system, a marking method, a marker detected in this method, and a marking program that allow a predetermined area of a target to be detected as a marker without attaching a marker thereto are provided.
The processing system includes: an irradiation unit that irradiates a target with irradiation light; an imaging unit that images emission light that the target itself emits in response to being irradiated with the irradiation light; and a detection unit that detects the emission light as a marker of the target based on an image taken by the imaging unit.

11 Claims, 24 Drawing Sheets

(51) Int. Cl.
*G06T 7/00* (2017.01)
*G06T 7/20* (2017.01)

(56) References Cited

U.S. PATENT DOCUMENTS

| | | | | |
|---|---|---|---|---|
| 2009/0091566 | A1* | 4/2009 | Turney | G02B 21/006 382/128 |
| 2015/0206614 | A1* | 7/2015 | Roh | A61B 6/542 378/62 |
| 2017/0142393 | A1* | 5/2017 | Oggier | G01B 11/2513 |
| 2017/0299620 | A1* | 10/2017 | Yang | G01P 5/22 |
| 2019/0063898 | A1* | 2/2019 | Zalevsky | G01P 3/38 |
| 2019/0111282 | A1 | 4/2019 | Yamada et al. | |

FOREIGN PATENT DOCUMENTS

| | | | | | |
|---|---|---|---|---|---|
| JP | H0921817 | A | | 1/1997 | |
| JP | 2002243581 | A | * | 8/2002 | |
| JP | 2003215143 | A | | 7/2003 | |
| JP | 2003215868 | A | | 7/2003 | |
| JP | 2012066460 | A | | 4/2012 | |
| JP | 2015075477 | A | * | 4/2015 | |
| JP | 2015-206753 | A | | 11/2015 | |
| WO | 9114644 | A1 | | 10/1991 | |
| WO | 2012/060393 | A1 | | 5/2012 | |
| WO | WO-2017169335 | A1 | * | 10/2017 | A61B 1/00006 |

* cited by examiner

[Figure 1]
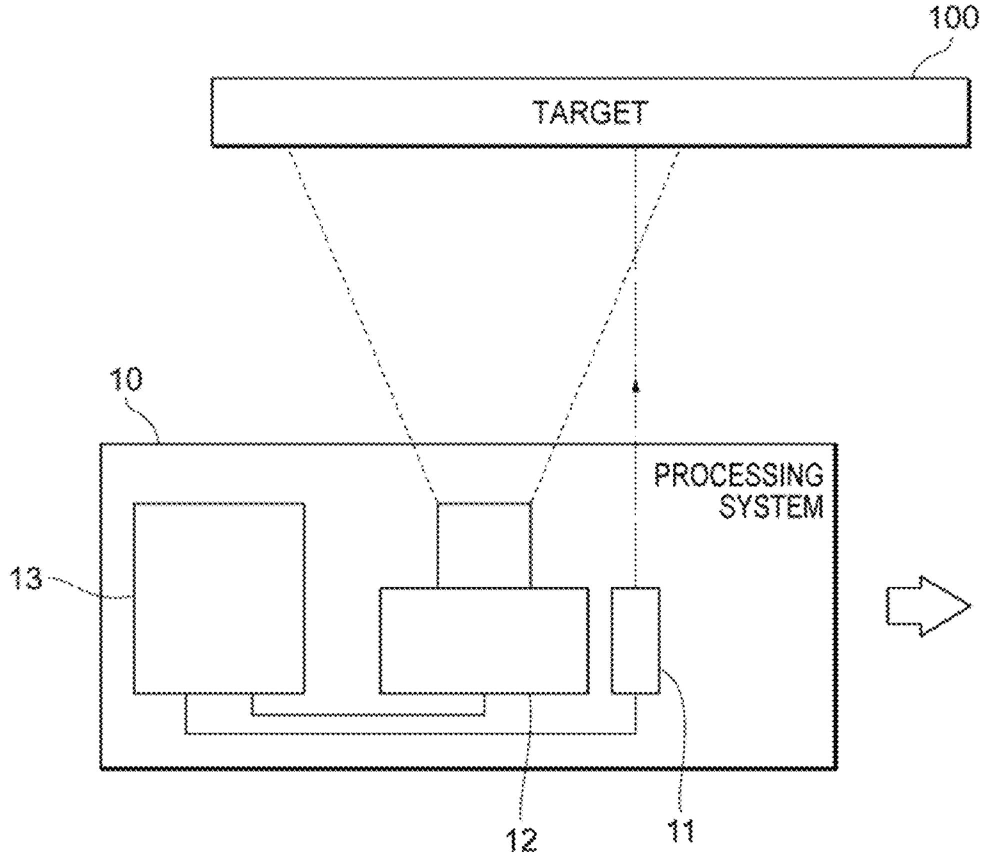

[Figure 2]
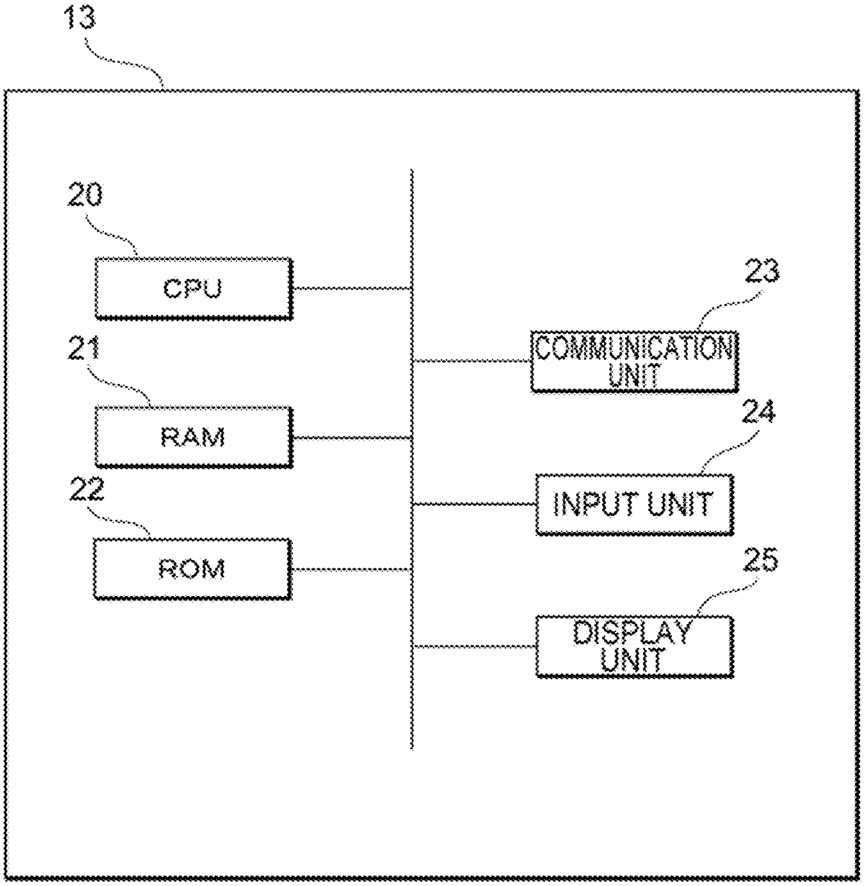

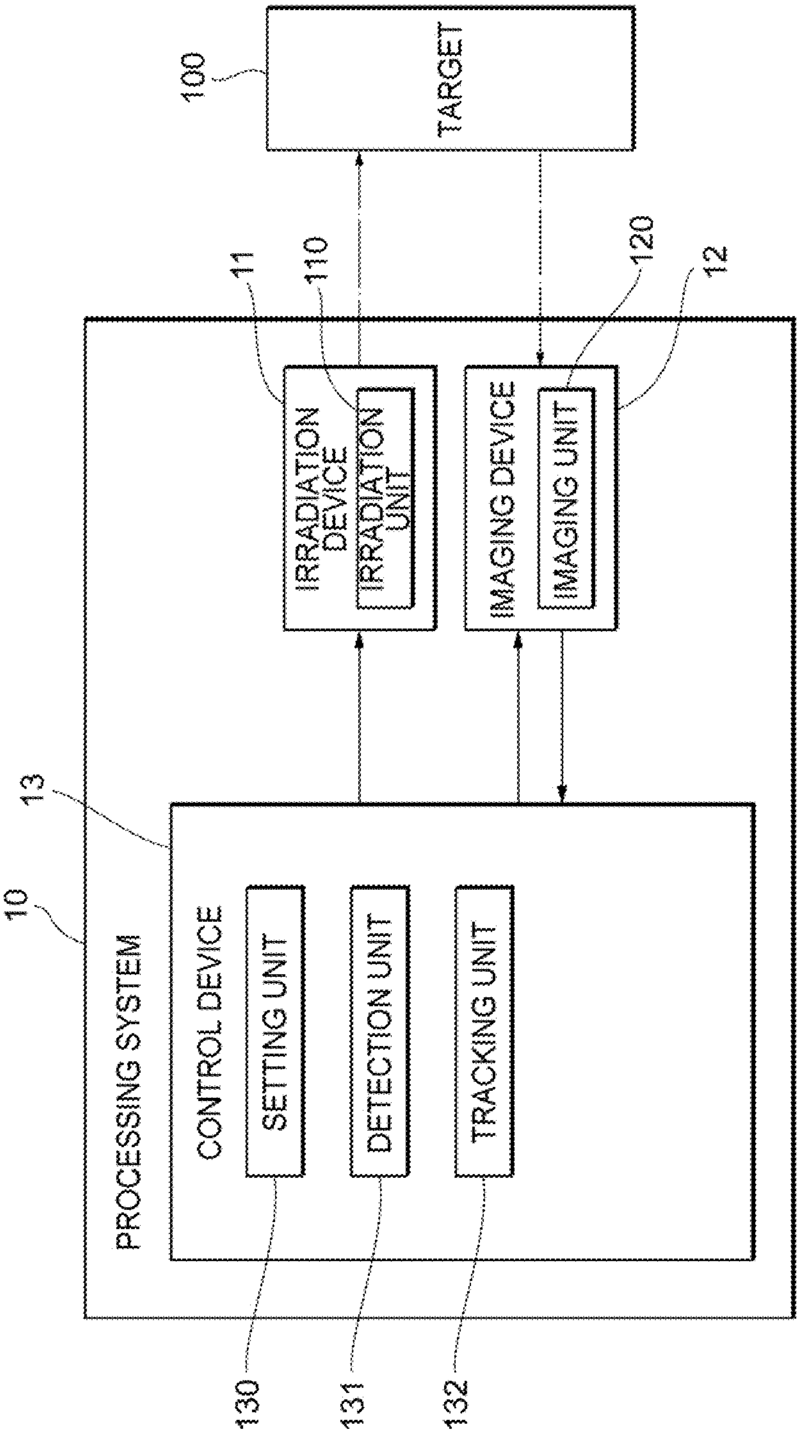
[Figure 3]

[Figure 4]
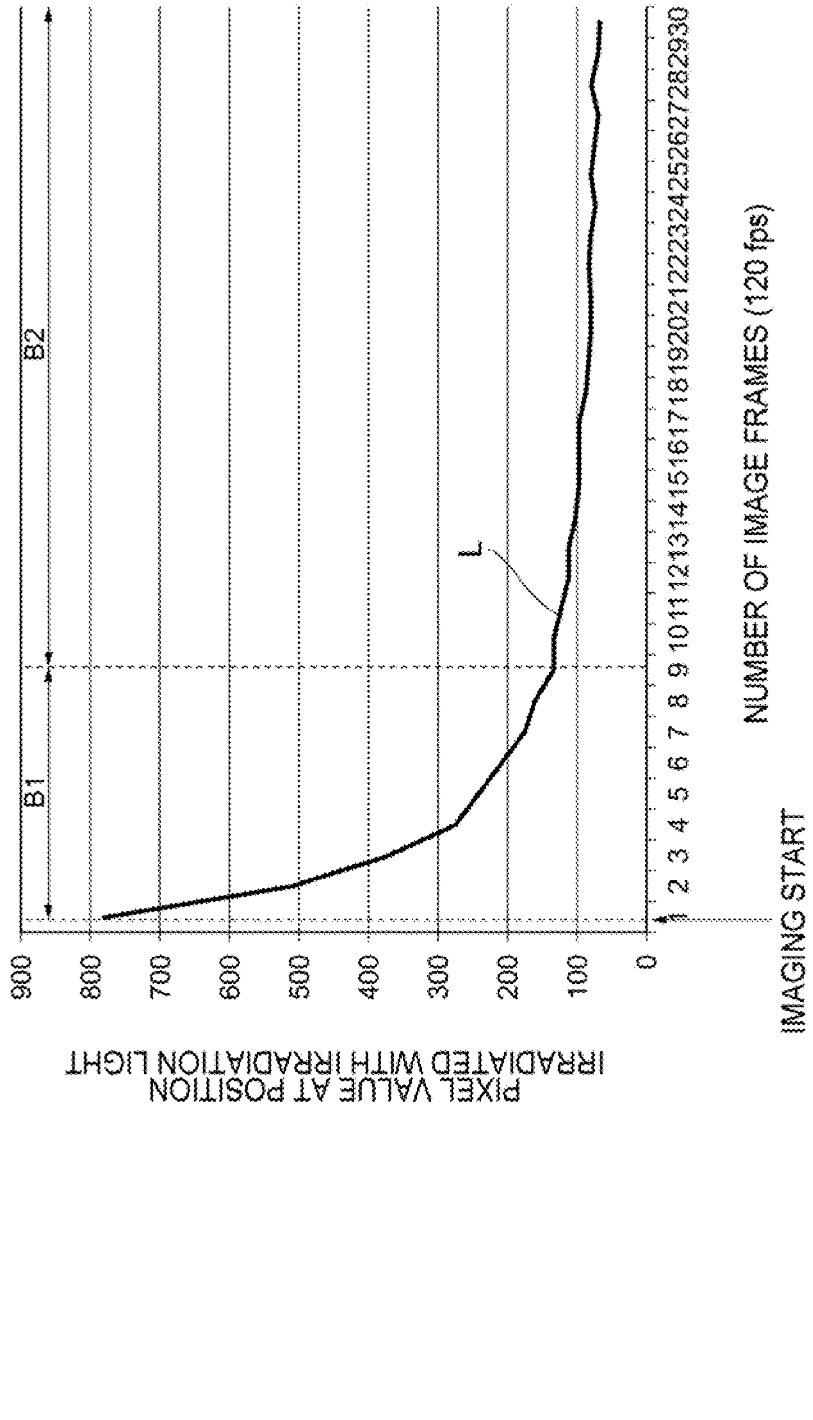

[Figure 5]
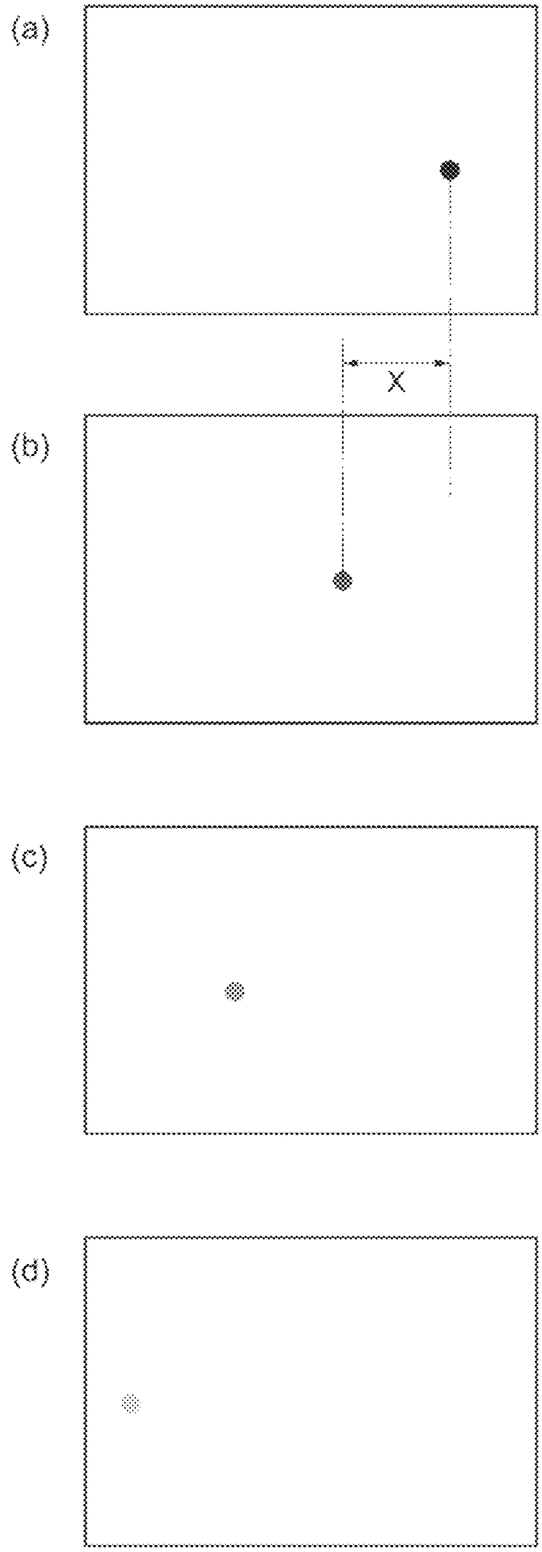

[Figure 6]
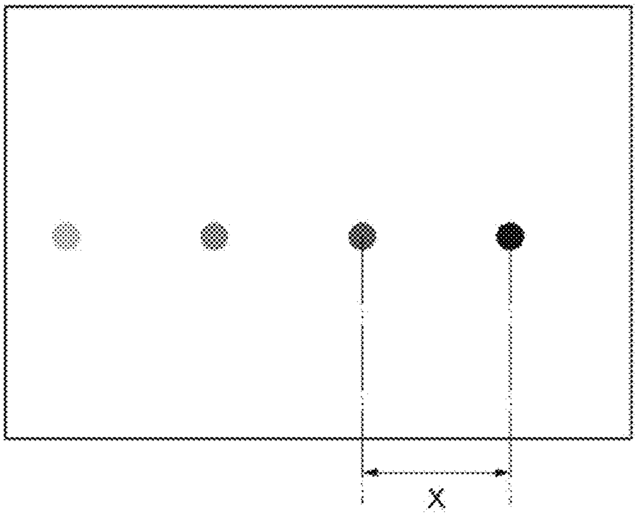

[Figure 7]
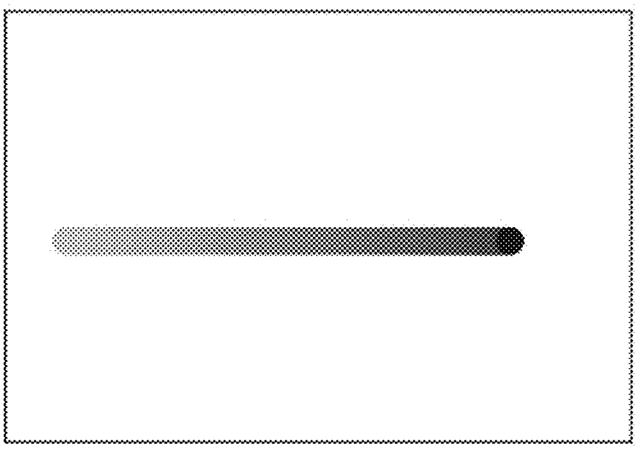

[Figure 8A]
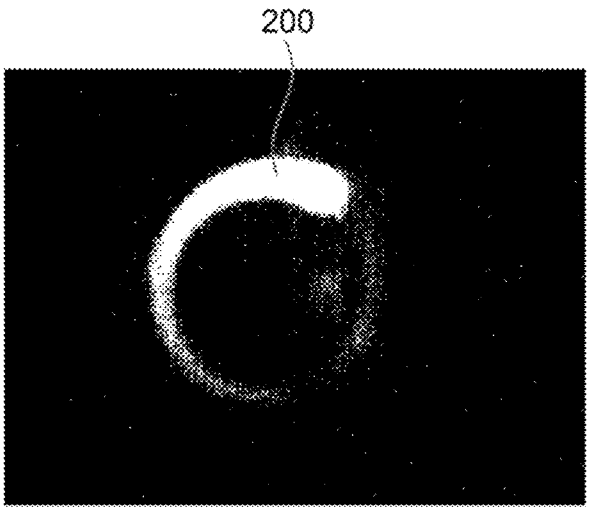

[Figure 8B]
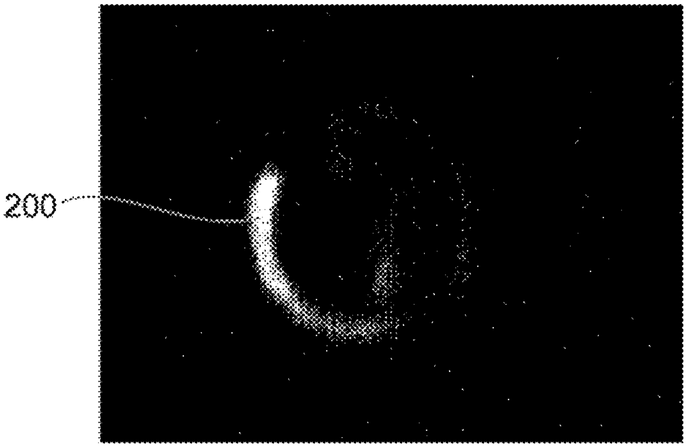

[Figure 9]
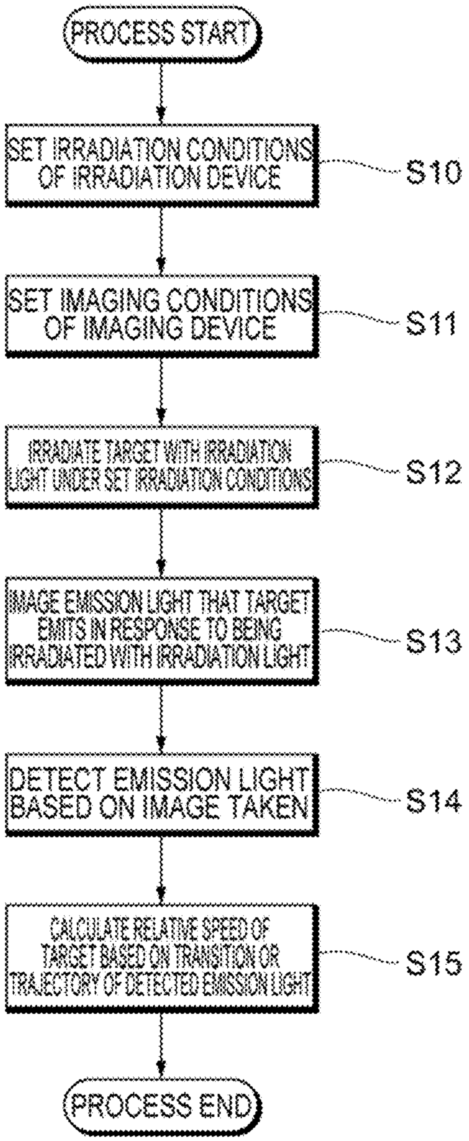

[Figure 10]
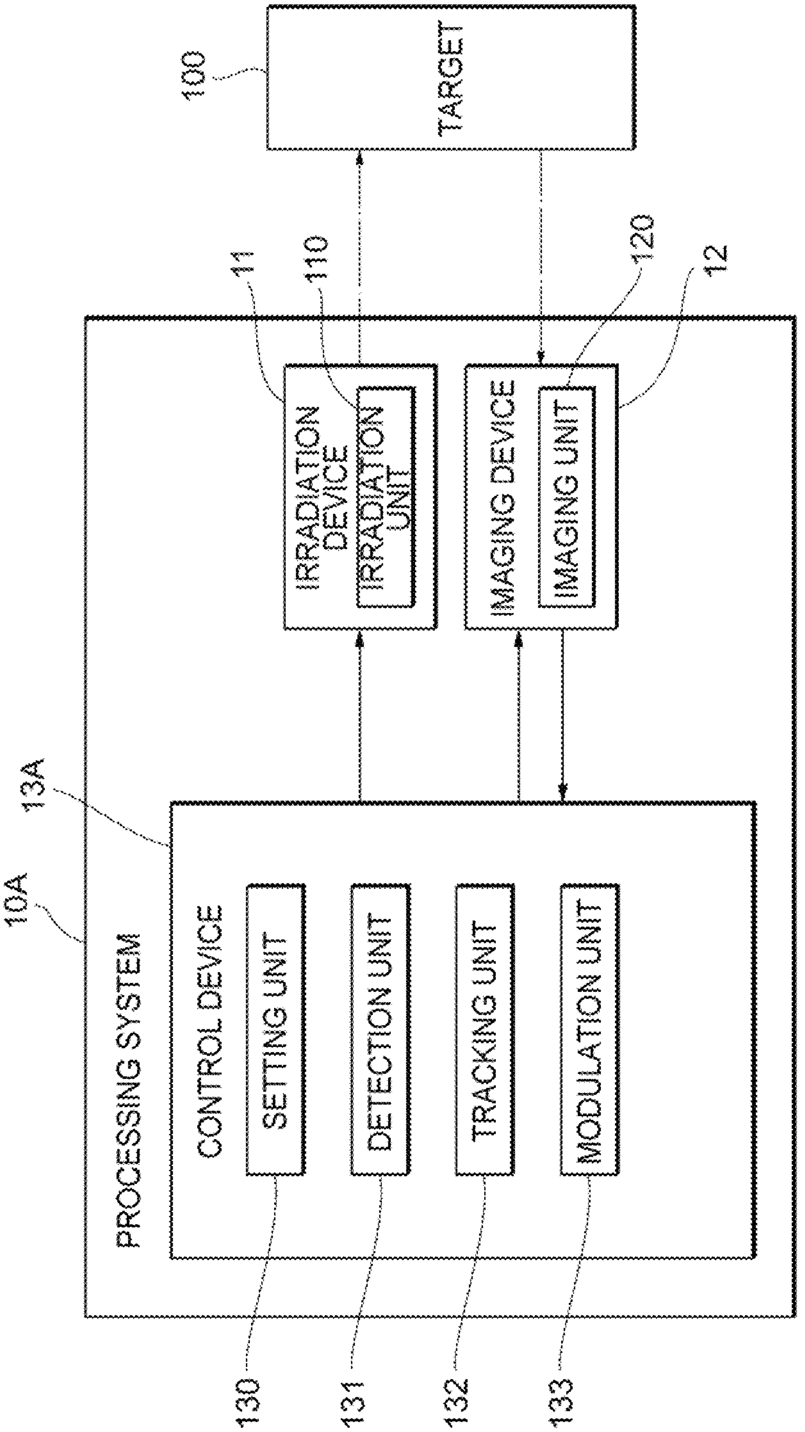

[Figure 11A]
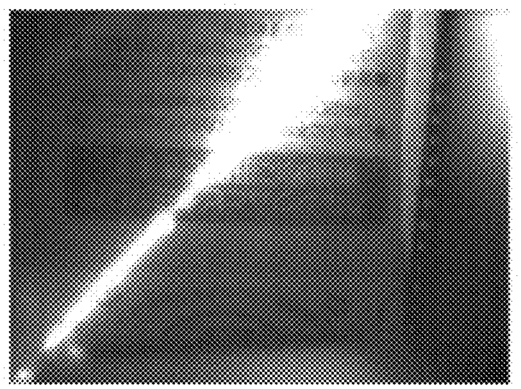

[Figure 11B]
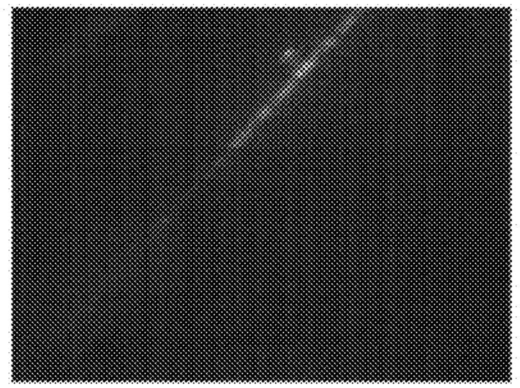

[Figure 12A]
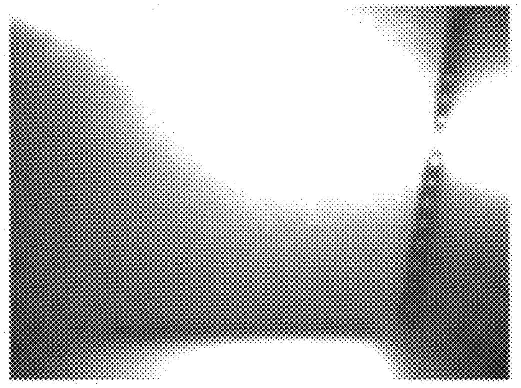

[Figure 12B]
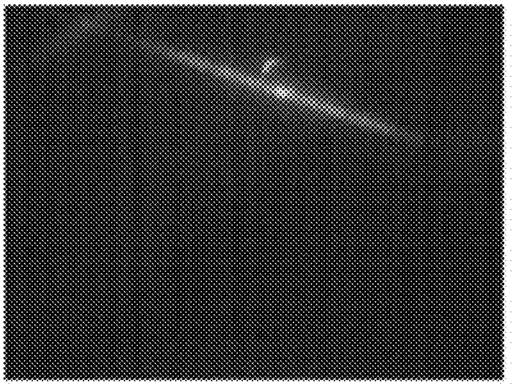

[Figure 13]
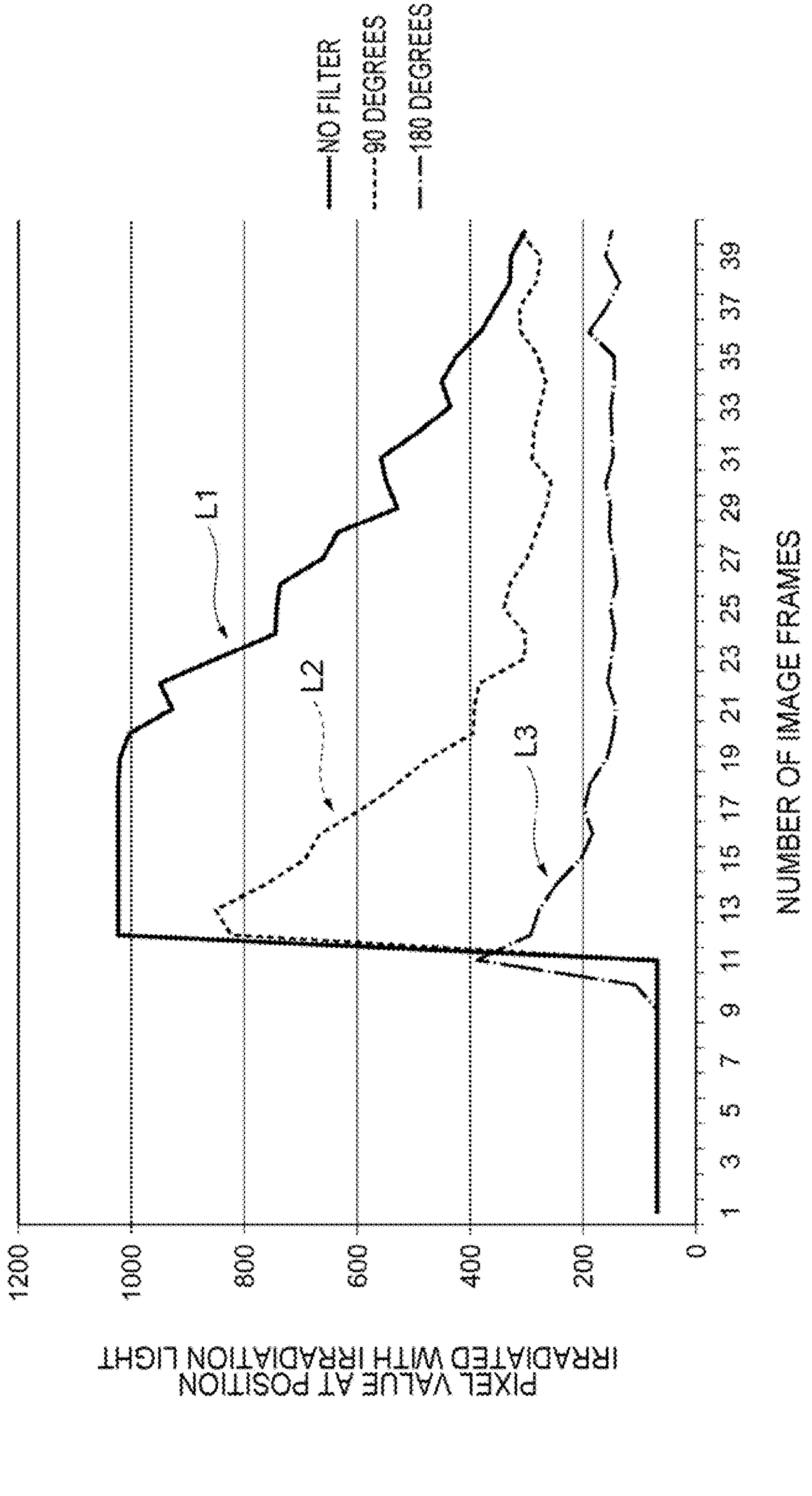

[Figure 14A]
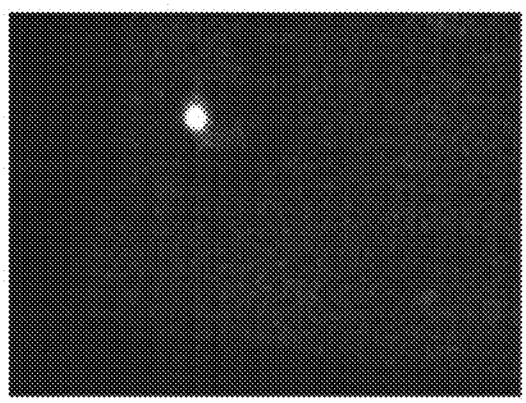

[Figure 14B]
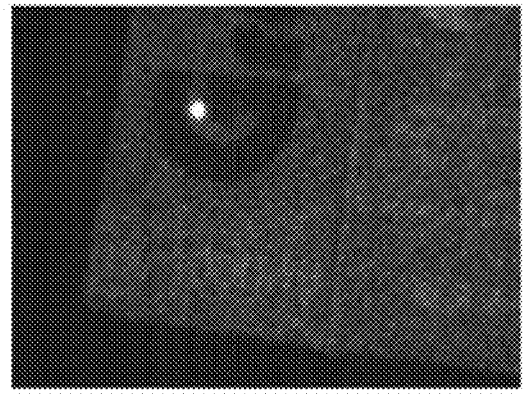

[Figure 15A]
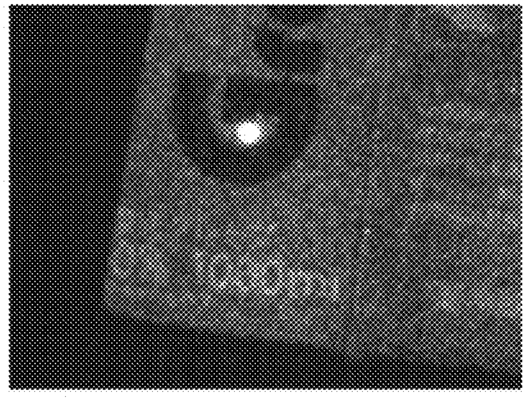

[Figure 15B]
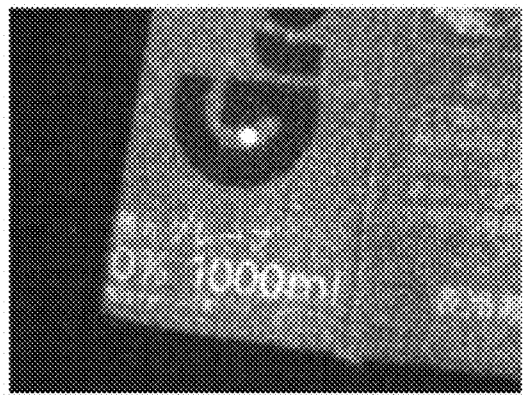

[Figure 16A]
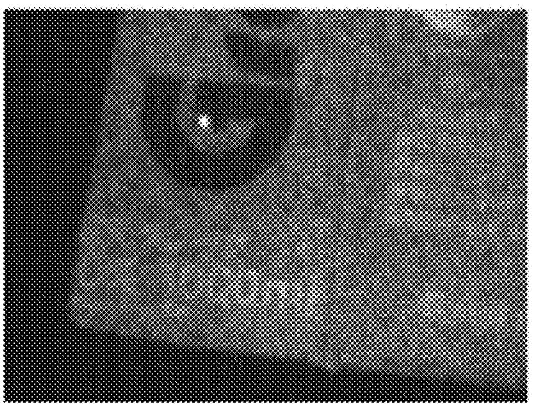

[Figure 16B]
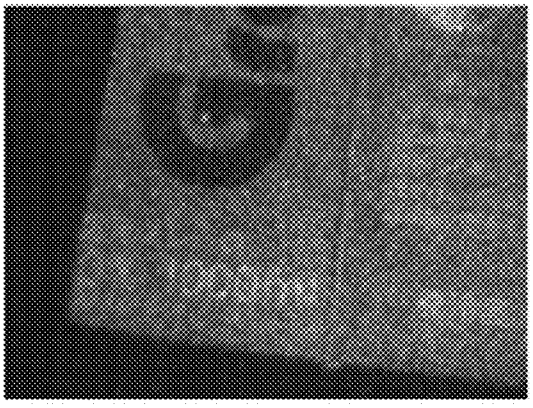

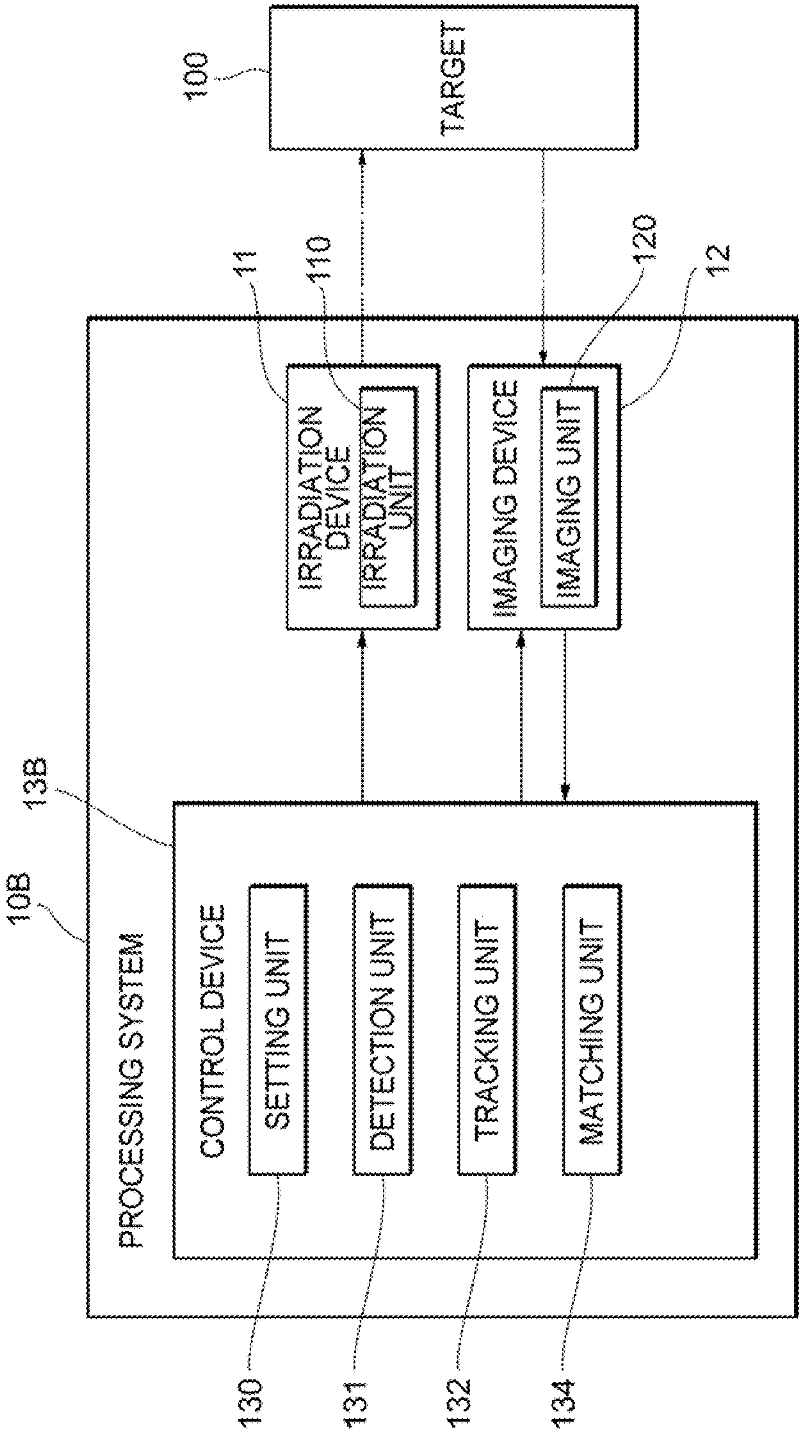
[Figure 17]

[Figure 18]
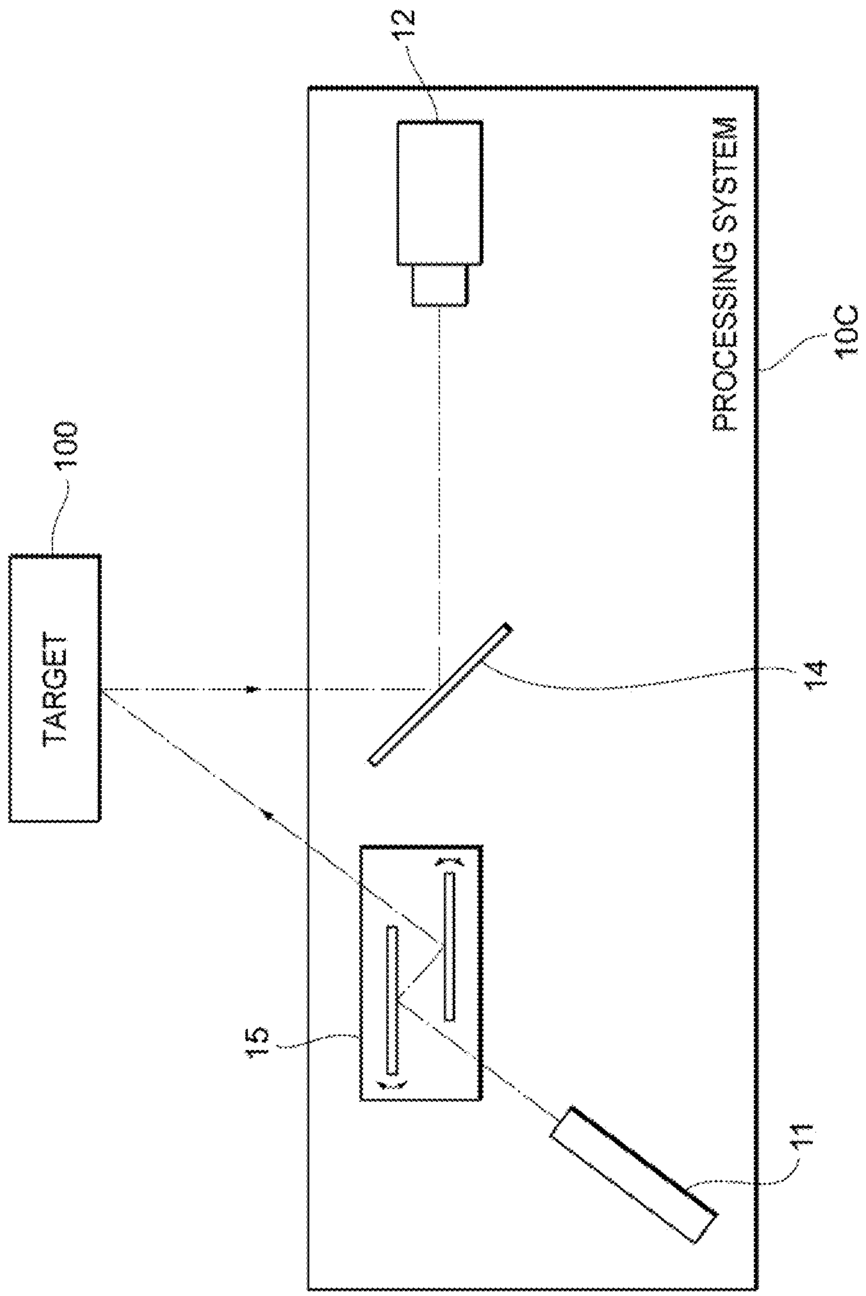

PROCESSING SYSTEM, MARKING METHOD, MARKER DETECTED IN SAID METHOD, AND MARKING PROGRAM

CROSS-REFERENCE TO RELATED APPLICATION

This application is based on Japanese Patent Application No. 2019-134851 filed on Jul. 22, 2019, of which the contents of the description are incorporated herein by reference.

TECHNICAL FIELD

The present invention relates to a processing system, a marking method, a marker detected in this method, and a marking program.

BACKGROUND ART

So-called object tracking that acquires position information and posture information on an object using computer vision has been conventionally utilized in various situations. Examples of common techniques in such object tracking include a method of estimating position information and posture information on a target by detecting a feature point of the target by image processing and tracking the detected feature point (see Non-Patent Literature 1). However, this method may have inadequate accuracy in detecting the feature point, as detection of the feature point is influenced by factors such as the shape, texture, and motion of the target.

One method to deal with this problem is to attach a marker serving as a feature point to a target in advance. As one example of such a marker, a marker that produces light by itself so as to become detectable (an active marker) is known. For example, Patent Literature 1 below discloses a method in which, to position a load hung by a hoist rope, a plurality of light-emitting diodes serving as markers is disposed on the load and light produced by these light-emitting diodes is imaged by a video camera. Patent Literature 2 below discloses a configuration in which, to detect an amount of movement of a transfer belt in an inkjet recording device, a light storing substance is applied to a surface of the transfer belt and the application area is irradiated with light in a predetermined pattern to thereby cause the light storing substance to produce light and act as a marker.

CITATION LIST

Patent Literature

Patent Literature 1: Japanese Translation of PCT International Application Publication No. 1993-505788

Patent Literature 2: Japanese Patent Laid-Open No. 2012-66460

Non-Patent Literature

Non-Patent Literature 1: Alper Yilmaz, Omar Javed, and Mubarak Shah, "Object Tracking: A Survey," ACM Computing Surveys, Vol. 38, No. 4, Article 13 (2006)

SUMMARY OF INVENTION

Technical Problem

However, the configurations disclosed in the above Patent Literature 1 and Patent Literature 2 involve the trouble of installing the light sources that can serve as markers on the target or applying the light storing substance to the target, and moreover cause a change in the appearance or the shape of the target. On the other hand, as described above, an attempt to detect a feature point of a target without using a marker can end up with the feature point being detected with inadequate accuracy.

Therefore, the present invention provides a processing system, a marking method, a marker detected in this method, and a marking program that allow a predetermined area of a target to be detected as a marker without attaching a marker thereto.

Solution to Problem

A processing system according to one aspect of the present invention includes: an irradiation unit that irradiates a target with irradiation light; an imaging unit that images emission light that the target itself emits in response to being irradiated with the irradiation light; and a detection unit that detects the emission light as a marker of the target based on an image taken by the imaging unit.

According to this aspect, the target itself emits the emission light by being irradiated with the irradiation light. Thus, a predetermined area of the target can be detected as a marker without changing the appearance or the shape of the target and without impairing the movability of the target. In addition, as the trouble of attaching a marker is saved, the work efficiency increases.

In the above aspect, the irradiation unit may irradiate the target with the irradiation light intermittently at intervals shorter than a luminescence duration time of the emission light.

According to this aspect, the processing system can cause the target to emit the next dose of emission light before the emission light corresponding to the preceding dose of irradiation disappears, and therefore can continuously detect at least a part of the target as a marker.

In the above aspect, the processing system may include a tracking unit that tracks the target based on a marker detected by the detection unit, and the irradiation unit may irradiate a specific area of the target with the irradiation light based on a position of the target tracked by the tracking unit.

According to this aspect, the processing system can radiate the next dose of irradiation light so as to overlap with the emission light corresponding to the preceding dose of irradiation, before this emission light disappears, and therefore can give a temporally uninterrupted marker to a predetermined area of the target.

In the above aspect, the processing system may further include a modulation unit that modulates the irradiation light, and the imaging unit may image emission light based on the modulated irradiation light to allow a marker detected by the detection unit to be identified.

According to this aspect, for example, when a plurality of processing systems coexists, it is possible to identify which detected marker was given by which of the processing systems. Or when a marker is given multiple times, it is possible to identify which detected marker was given at which time.

In the above aspect, the processing system may further include a matching unit that performs matching of a marker in each image detected by the detection unit. The irradiation light may include patterned light in a random pattern that spreads over a two-dimensional plane. The imaging unit may image, at multiple timings, emission light in a random pattern that the target itself emits in response to the irradiation light. The matching unit may perform matching of a marker in a random pattern based on multiple images taken at multiple timings.

According to this aspect, a marker in a random pattern can be relatively easily given to the target, so that the accuracy of a matching process is increased compared with, for example, that in a method of artificially attaching a marker to a target.

In the above aspect, the processing system may further include an optical path control unit that guides irradiation light radiated from the irradiation unit to any area of the target.

According to this aspect, it is easy to continuously irradiate a specific area of the target with the irradiation light, even when the target moves relatively to the irradiation unit. Further, it is easy to give a marker to a target, even when the target is of a small size or a surface of the target poses restrictions on irradiation.

In the above aspect, the imaging unit may include a high-speed camera that images the emission light at a frame rate of 100 fps or higher.

According to this aspect, if the luminescence duration time of the emission light is a few tens of milliseconds or longer, the emission light emitted from the target can be imaged in multiple images. Thus, the emission light can be used as a marker for many targets without applying a light storing material or the like.

In the above aspect, the imaging unit may image emission light that is emitted from the target itself after irradiation of the target with the irradiation light is stopped.

According to this aspect, the irradiation light and the emission light can be distinguished from each other when imaging the emission light, so that the emission light can be detected as a marker with high accuracy.

In the above aspect, the emission light may include delayed fluorescence or phosphorescence that the target itself emits after being irradiated with the irradiation light.

According to this aspect, the emission light is emitted by a light storing phenomenon in the target, independently of the external appearance and the shape of the target, so that the emission light can be detected robustly in terms of the external appearance and the shape of the target.

A marking method according to another aspect of the present invention includes: irradiating a target with irradiation light; imaging emission light that the target itself emits in response to being irradiated with the irradiation light; and detecting the emission light as a marker of the target based on an image taken.

According to this aspect, the target itself emits the emission light by being irradiated with the irradiation light. Thus, a predetermined area of the target can be detected as a marker without changing the appearance or the shape of the target and without impairing the movability of the target. In addition, as the trouble of attaching a marker is saved, the work efficiency increases.

A marker according to another aspect of the present invention is detected in the marking method described above.

According to this aspect, the emission light that the target itself emits by being irradiated with the irradiation light functions as a marker.

A marking program according to another aspect of the present invention causes a computer to function as: an irradiation unit that irradiates a target with irradiation light; an imaging unit that images emission light that the target itself emits in response to being irradiated with the irradiation light; and a detection unit that detects the emission light as a marker of the target based on an image taken by the imaging unit.

According to this aspect, the target itself emits the emission light by being irradiated with the irradiation light. Thus, a predetermined area of the target can be detected as a marker without changing the appearance or the shape of the target and without impairing the movability of the target. In addition, as the trouble of attaching a marker is saved, the work efficiency increases.

Advantageous Effects of Invention

According to the present invention, a processing system, a marking method, a marker detected in this method, and a marking program that allow a predetermined area of a target to be detected as a marker without attaching a marker thereto are provided.

BRIEF DESCRIPTION OF DRAWINGS

FIG. 1 is a diagram showing an example of the configuration of a processing system according to an embodiment of the present invention.

FIG. 2 is a diagram showing the physical configuration of the control device shown in FIG. 1.

FIG. 3 is a diagram showing functional blocks of the processing system according to the embodiment of the present invention.

FIG. 4 is a graph showing luminescence data acquired by the processing system according to the embodiment of the present invention.

FIG. 5 is views showing representations of images taken by an imaging device in a case where an irradiation device radiated pulsed irradiation light once.

FIG. 6 is a view showing a representation of an image taken by the imaging device in a case where the irradiation device radiated pulsed irradiation light multiple times intermittently.

FIG. 7 is a view showing a representation of an image taken by the imaging device in a case where the irradiation device radiated continuous irradiation light.

FIG. 8A is a view showing an image taken by the imaging device immediately after irradiation light that had been radiated to a rotating target was stopped.

FIG. 8B is a view showing an image taken by the imaging device 100 milliseconds after the irradiation light that had been radiated to the rotating target was stopped.

FIG. 9 is a flowchart of a tracking process executed by the processing system according to the embodiment of the present invention.

FIG. 10 is a diagram showing functional blocks of a processing system according to a first modified example of the embodiment of the present invention.

FIG. 11A is a view showing an image taken by the imaging device during irradiation of a milk carton with spatially modulated irradiation light.

FIG. 11B is a view showing an image taken by the imaging device immediately after irradiation of the milk carton with the spatially modulated irradiation light was stopped.

FIG. 12A is a view showing an image taken by the imaging device during irradiation of a sketchbook with spatially modulated irradiation light.

FIG. 12B is a view showing an image taken by the imaging device immediately after irradiation of the sketchbook with the spatially modulated irradiation light was stopped.

FIG. 13 is a graph showing luminescence data in a case where the intensity of irradiation light was modulated.

FIG. 14A is a view showing a part of an image taken under conditions corresponding to luminescence data L1 of FIG. 13.

FIG. 14B is a view showing a part of an image taken under the conditions corresponding to the luminescence data L1 of FIG. 13.

FIG. 15A is a view showing a part of an image taken under conditions corresponding to luminescence data L2 of FIG. 13.

FIG. 15B is a view showing a part of an image taken under the conditions corresponding to luminescence data L2 of FIG. 13.

FIG. 16A is a view showing a part of an image taken under conditions corresponding to luminescence data L3 of FIG. 13.

FIG. 16B is a view showing a part of an image taken under the conditions corresponding to luminescence data L3 of FIG. 13.

FIG. 17 is a diagram showing functional blocks of a processing system according to a second modified example of the embodiment of the present invention.

FIG. 18 is a diagram showing an example of the configuration of a processing system according to a third modified example of the embodiment of the present invention.

DESCRIPTION OF EMBODIMENT

An embodiment according to one aspect of the present invention (hereinafter also written as "the present embodiment") will be described below based on the drawings. Those parts in the drawings that are denoted by the same reference signs have the same or similar configurations.

FIG. 1 is a diagram showing an example of the configuration of a processing system according to the present embodiment. A processing system 10 is a system that can detect emission light emitted from a target 100 itself as a marker without attaching a marker to the target 100.

As shown in FIG. 1, the processing system 10 includes, for example, an irradiation device 11, an imaging device 12, and a control device 13.

The irradiation device 11 irradiates the target 100 with irradiation light under optional irradiation conditions. The irradiation device 11 may be, for example, an ultraviolet laser or an ultraviolet light-emitting diode (LED). The wavelength of the irradiation light radiated by the irradiation device 11 may be 10 nm or longer. Using irradiation light with a wavelength of 10 nm or longer can simplify the management when irradiating the target 100 with the irradiation light and keep the operating cost of the processing system 10 low. The irradiation device 11 may include one or more light sources that generate rays of irradiation light having different wavelengths. The irradiation device 11 may include a variable-wavelength laser or LED as a light source, or may include a plurality of lasers or LEDs each having a different wavelength as light sources. The irradiation light radiated by the irradiation device 11 may be collimated light or pulsed light. As will be described later, the irradiation device 11 may, for example, radiate the irradiation light intermittently or radiate the irradiation light continuously.

When the target 100 is irradiated with the irradiation light, emission light is emitted from an area of the target 100 that has been irradiated with the irradiation light. In this Description, "emission light" refers to light that the target itself emits in response to being irradiated with the irradiation light and that is emitted with a delay after reflection light is emitted from the target. The emission light can be observed also after irradiation of the target 100 with the irradiation light is stopped, and examples include delayed fluorescence, phosphorescence, afterglow, and light storing generated by electronic excitation in the target. Or the emission light includes infrared light generated by thermal excitation in the target. Stopping irradiation of the target 100 with the irradiation light is not limited to turning the irradiation device 11 off, but also includes various configurations for preventing the irradiation light from reaching the target 100, such as changing the optical path of the irradiation light.

The imaging device 12 images the emission light that the target 100 emits in response to being irradiated with the irradiation light. As the imaging device 12 images the emission light, a temporal change in the position of the emission light or a temporal change in the luminescence intensity thereof can be imaged, which enables, for example, various measurements of the target 100 using this emission light as a marker. Hereinafter, a time for which the emission light remains observable by the imaging device 12 will be also referred to as a "luminescence duration time."

The imaging device 12 may be, for example, a high-speed camera that images the emission light at a frame rate of 100 fps or higher. By using a high-speed camera as the imaging device 12, the emission light can be detected also when the luminescence duration time of the emission light is a few milliseconds to a few tens of milliseconds. Since the emission light can be imaged with a relatively short time of exposure, compared with when a relatively long time of exposure is performed, the amount of movement of the target 100 between imaging frames can be reduced and occurrence of motion blur can be reduced. The frame rate of the high-speed camera may be 1,000 fps or 10,000 fps or higher.

As a light receiving sensor of the imaging device 12, any sensor may be used according to the wavelength spectrum of the emission light emitted from the target 100. The wavelength spectrum of the emission light emitted from the target 100 is, for example, an ultraviolet region to a visible light region, but can reach a near-infrared region depending on the type of the target 100, the wavelength of the irradiation light, etc.; therefore, it is desirable that a light receiving sensor be selected as appropriate.

The emission light imaged by the imaging device 12 includes emission light that has been generated during radiation of the irradiation light and emission light that has been generated after radiation of the irradiation light to the target 100 is stopped. Imaging the emission light that has been generated after radiation of the irradiation light is stopped makes it easy to distinguish the irradiation light and the emission light from each other. The method to distinguish the irradiation light and the emission light from each other is not limited thereto. For example, when the emission light is light generated by electronic excitation in the target 100, the irradiation light and the emission light are different from each other in the wavelength spectrum. Therefore, the irradiation light may be prevented from directly entering the imaging device 12 by, for example, providing a filter that blocks light having the wavelength of the irradiation light on the optical path of the imaging device 12.

In the present embodiment, an example is shown in which the imaging device 12 is provided on the side of the irradiation device 11 based on the assumption of a situation where the emission light is emitted from the target 100 toward the irradiation device 11. On the other hand, for example, when the target 100 is a substance having light transmission properties, and transmission of the emission light through the target 100 results in a higher intensity of the emission light on the side of the transmitted light than on the side of the irradiation device 11, the imaging device 12 may be disposed on the side of the transmitted light. In the case of a target 100 that has a maximum intensity of the emission light in a specific angular direction in a spatial distribution of the intensity of the emission light (e.g., in the case of an anisotropic material), the angle of the imaging device 12 or the light receiving sensor of the imaging device 12 may be set as necessary to the direction of the maximum emission light relatively to the target 100.

The control device 13 controls irradiation by the irradiation device 11 by sending and receiving signals to and from the irradiation device 11, and controls imaging by the imaging device 12 by sending and receiving signals to and from the imaging device 12. Further, the control device 13 detects the emission light based on an image taken by the imaging device 12. As the control device 13 detects the emission light, the emission light emitted from the target 100 itself functions as a marker of the target 100. In this Description, thus making a predetermined area of the target itself function as a marker without attaching or applying a physical marker or a substance that exhibits a marker function to the target is also called "marking."

FIG. 2 is a diagram showing the physical configuration of the control device shown in FIG. 1. The control device 13 has a central processing unit (CPU) 20 corresponding to a calculation unit, a random-access memory (RAM) 21 and a read-only memory (ROM) 22 corresponding to storage units, a communication unit 23, an input unit 24, and a display unit 25. These components are connected to one another through a bus so as to be able to send and receive data. While in this example a case where the control device 13 is formed by one computer will be described, the control device 13 may be realized by a combination of a plurality of computers. The components shown in FIG. 2 are examples, and the control device 13 may have other components than those components or may not have some of those components.

The CPU 20 is a control unit that performs control relating to execution of programs stored in the RAM 21 or the ROM 22, and calculates and processes data. The CPU 20 is a calculation unit that executes a program for irradiating a target with the irradiation light and detects the emission light emitted from the target itself (hereinafter also referred to as a "marking program"). The CPU 20 receives various pieces of data from the communication unit 23 and the input unit 24, and displays results of calculations of the data on the display unit 25 or stores them in the RAM 21 or the ROM 22.

Of the storage units, the RAM 21 is one that allows rewriting of data and may be formed by, for example, a semiconductor memory device. The RAM 21 may store the marking program executed by the CPU 20 etc. However, these are merely examples, and the RAM 21 may store other data than those pieces of data or may not store some of those pieces of data.

Of the storage units, the ROM 22 is one that allows readout of data and may be formed by, for example, a semiconductor memory device. The ROM 22 may store, for example, the marking program and data that is not to be rewritten.

The communication unit 23 is an interface that connects the control device 13 to other devices. The communication unit 23 may be connected to a communication network, such as the Internet.

The input unit 24 receives input of data from a user and may include, for example, a keyboard and a touch panel.

The display unit 25 visually displays calculation results of the CPU 20, and may be formed by, for example, a liquid crystal display (LCD). The display unit 25 may display images taken by the imaging device 12, etc.

The marking program may be provided by being stored in a computer-readable storage medium, such as the RAM 21 or the ROM 22, or may be provided through a communication network connected by the communication unit 23. In the control device 13, various actions to be described below are realized as the CPU 20 executes the marking program. These physical components are merely examples and need not necessarily be independent components. For example, the control device 13 may include a large-scale integration (LSI) in which the CPU 20 is integrated with the RAM 21 and the ROM 22.

Turning back to FIG. 1, the target 100 may be any object, and examples include an object that contains any light storing component in the whole or a part thereof. That is, the target 100 in the present embodiment is not an object with a light storing substance artificially applied to its surface, but is instead an object that produces light for about a few milliseconds to a few hundred milliseconds or longer by a light storing phenomenon based on the electron structure of the target itself. Examples of the target 100 include, but are not limited to, a milk carton, sketchbook, office paper, concrete, granulated sugar, sugar, chocolate, and cloth. By using the emission light due to a light storing phenomenon as a marker, the emission light can be detected robustly in terms of the external appearance and the shape of the target 100.

The target 100 may move relatively to at least a part of the processing system 10. For example, FIG. 1 shows a state where the target 100 is standing still while the irradiation device 11, the imaging device 12, and the control device 13 are moving integrally in the arrow direction. By detecting the emission light as a marker, the processing system 10 can measure, for example, the shape of the target 100 and the relative position, the relative posture, and the relative speed of the target 100 relative to the processing system 10. Based on the measured relative position, relative posture, and relative speed, the processing system 10 can calculate the position, posture, and speed of the target 100 in an actual space.

FIG. 3 is a diagram showing functional blocks of the processing system according to the present embodiment. The irradiation device 11 includes an irradiation unit 110. The imaging device 12 includes an imaging unit 120. The control device 13 includes a setting unit 130, a detection unit 131, and a tracking unit 132.

The irradiation unit 110 irradiates the target 100 with the irradiation light based on control by the control device 13. The imaging unit 120 images the emission light emitted from the target 100 based on control by the control device 13. In the present embodiment, the example in which the irradiation device 11 includes the irradiation unit 110 and the imaging device 12 includes the imaging unit 120 is shown, but these devices need not necessarily be independent components. For example, the control device 13 may include the functions of the irradiation unit and the imaging unit.

The setting unit 130 sets irradiation conditions of the irradiation light radiated by the irradiation device 11 and sets imaging conditions in the imaging device 12. The irradiation conditions of the irradiation light include at least one of the wavelength of the irradiation light, the intensity of the irradiation light, the irradiation time of the irradiation light, and the interval of the irradiation light. The wavelength of the irradiation light may be, for example, 200 nm to 400 nm in an ultraviolet region, but may also be 200 nm or shorter in a far-ultraviolet region or 400 nm or longer in a visible light region.

The luminescence duration time of the emission light tends to become longer as the wavelength of the irradiation light becomes shorter, the intensity of the irradiation light becomes higher, and the irradiation time of the irradiation light becomes longer. To track the target, therefore, the wavelength of the irradiation light may be set to be relatively short, the intensity of the irradiation light may be set to be relatively high, and the irradiation time of the irradiation light may be set to be relatively long. However, extending the irradiation time of the irradiation light to a certain time or longer does not always change the luminescence duration time of the emission light; therefore, the irradiation time of the irradiation light may be set to the shortest time of times at which the luminescence duration time of the emission light is close to a maximum value.

The imaging conditions in the imaging device 12 include at least one of the frame rate, the frame period, the exposure time, and the resolution. The irradiation conditions of the irradiation light may be designed as appropriate according to, for example, the frame rate or the exposure time of the imaging device 12.

The detection unit 131 captures an image taken by the imaging device 12 and detects the emission light emitted from the target 100 based on the image. While the method for detecting the emission light is not particularly limited, it may include, for example, at least one of performing binarization processing on the image taken, performing expansion processing or reduction processing to increase the SN ratio, selecting an area with the largest outline among a plurality of extracted areas, and obtaining the coordinate of the center of gravity of the selected area.

The tracking unit 132 tracks the target 100 by measuring at least one of the shape of the target 100 and the relative position, the relative posture, and the relative speed of the target 100 relative to the processing system 10 based on the position coordinate in the image of the emission light detected by the detection unit 131. Based on the measured relative position, relative posture, and relative speed, the tracking unit 132 calculates the position, the posture, and the speed of the target 100 in an actual space. For tracking by the tracking unit 132, a technique similar to the configuration of using a physical marker or a feature point of a target as a marker can be used, and therefore a detailed description thereof will be omitted.

Thus configured, the processing system 10 can track the target 100 based on, for example, the measured position of the target in the actual space. Tracking of the target 100 includes tracking the motion of the target 100 within an image, and changing the view direction of the imaging device according to the movement of the target 100 such that the target 100 remains inside the field of view of the imaging device.

FIG. 4 is a graph showing luminescence data acquired by the processing system 10 according to the present embodiment. Luminescence data L shown in this graph is obtained by irradiating a sketchbook that is one example of the target 100 with a laser having a wavelength of 375 nm as irradiation light for 500 ms and taking an image thereof by the imaging device 12 at 120 fps after stopping the irradiation. From pixels in the imaging result, this data represents, in 10 bits (0 to 1023), the pixel value of a pixel at a center coordinate of an area that has been irradiated with the irradiation light. In FIG. 4, the abscissa axis shows the number of image frames and the ordinate axis shows the pixel value in the area having been irradiated with the irradiation light. This pixel value corresponds to the intensity of the emission light (luminescence intensity).

From the luminescence data L, it can be read that the pixel value decays gradually after the start of imaging.

The luminescence data L after radiation of the irradiation light was stopped can be divided into an exponential decay section B1 and a slow decay section B2. As soon as radiation of the irradiation light ends, the exponential decay section B1 starts and the pixel value decays exponentially. In the case of this example, the exponential decay section B1 lasts for about nine frames (75 ms) after the start of imaging, with the pixel value decaying by roughly 80% from a maximum value in the meantime. Following the exponential decay section B1, the slow decay section B2 lasts for about 21 frames (175 ms), with the pixel value decaying to a minimum value in the meantime.

When the decay characteristics of the pixel value of the emission light in a certain target are thus known, the time that has elapsed since the stop of radiation of the irradiation light can be estimated based on the pixel value of the marker detected at a certain time. Therefore, it can be said that the marker formed by the emission light contains both space information showing its position and time information showing the elapsed time.

In this example, images are taken at 120 fps by one imaging device 12 after radiation of the irradiation light. Alternatively, the imaging device 12 may include a camera that images the emission light of the target 100 at a frame rate lower than 120 fps, and a high-speed camera, and may image the emission light by the high-speed camera during a period in which the temporal change is relatively fast and image the emission light by the camera during a period in which the temporal change is relatively slow. Here, the period in which the temporal change is relatively fast is, for example, the exponential decay section B1, and the period in which the temporal change is relatively slow is, for example, the decay section B2. In this case, the high-speed camera may be one that can capture a change in brightness in the order of 10 nsec, i.e., that takes images at about $10^8$ fps. By thus using two cameras, a high-speed camera and a relatively low-speed camera, a continuous image can be taken with sufficient time resolution in both the period in which the temporal change in the emission light is relatively fast and the period in which it is slow.

In this example, the irradiation time of the irradiation light is 500 ms, but the irradiation time is not limited thereto. For example, when the target 100 is plain paper, the lifetime of the emission light tends to saturate when the irradiation time of the irradiation light is set to about 200 ms or longer. Thus, the irradiation time of the irradiation light for the target 100 may be set so as to be equal to or longer than the irradiation time at which the lifetime of the emission light saturates.

Next, a specific method of tracking a target under various irradiation conditions and imaging conditions will be described with reference to FIG. 5 to FIG. 7. For convenience, a case where the irradiation device 11 radiates point-shaped irradiation light will be described below as an example, but the irradiation light is not limited to a point shape.

FIG. 5 is views showing representations of images taken by the imaging device in a case where the irradiation device radiated pulsed irradiation light once. In this aspect (hereinafter also referred to as an "aspect A"), it is assumed that the luminescence duration time of the emission light is longer than the exposure time of the imaging device. In other words, it is assumed that the next image is taken within the luminescence duration time of the emission light of which one image has been taken. The images shown in FIG. 5(*a*) to (*d*) are arranged in the order of being taken by the imaging device 12.

When the irradiation device 11 radiates pulsed irradiation light once, emission light is emitted from an area of the target 100 that has been irradiated with the irradiation light. Thus, a predetermined area of the target 100 is marked. Thereafter, even when the target 100 moves relatively to the imaging device 12, the emission light keeps being emitted from this area throughout the luminescence duration time.

The imaging device 12 images the target 100 at multiple timings. The detection unit 131 detects the emission light from each image taken. In this case, since the target 100 is moving relatively to the imaging device 12, the position of the detected emission light transitions gradually from one image to another as shown in FIG. 5. Therefore, the tracking unit 132 can calculate the relative speed of the target 100 based on the transition of the position of the emission light in multiple images taken. FIG. 5 is views of representations in a case where the exposure time of the imaging device 12 is assumed to be extremely short relatively to the relative speed of the target 100. In reality, when the target 100 moves during the exposure time of the imaging device 12, each ray of emission light assumes a predetermined length as in FIG. 7 to be described later. The same applies to FIG. 6 to be described later.

For example, as shown in FIG. 5, when the positions of rays of emission light detected in multiple images are separated from each other by X pixels and the frame period of the imaging device 12 is t seconds, a pixel relative speed Vp of the target 100 is calculated by Vp=X/t (pixel/second). For example, when a surface of the target 100 facing the imaging device 12 is a planar surface and the target 100 performs a translational motion relatively to the imaging device 12, this pixel relative speed Vp can be converted into an actual relative speed in an actual space.

In the aspect A, as the frame rate of the imaging device 12 becomes higher, the interval between the rays of emission light detected in the respective images becomes shorter and therefore the accuracy of the calculated relative speed of the target 100 becomes higher. Further, in the aspect A, the target 100 can be tracked based on the transition of the position of the emission light emitted in response to a certain dose of irradiation, so that the relative speed of the target 100 can be calculated regardless of the distance between the irradiation device 11 and the imaging device 12. While the case where the irradiation device 11 radiates the irradiation light once has been described above as an example, the same method can be adopted also when the irradiation device 11 radiates the irradiation light multiple times.

FIG. 6 is a view showing a representation of an image taken by the imaging device in a case where the irradiation device radiated pulsed irradiation light multiple times intermittently. In this aspect (hereinafter also referred to as an "aspect B"), it is assumed that the luminescence duration time of the emission light is longer than the interval of the irradiation light. In other words, it is assumed that the next dose of irradiation light is radiated within the luminescence duration time of the emission light emitted in response to one dose of irradiation.

Since the target 100 is moving relatively to the irradiation device 11, when the irradiation device 11 radiates pulsed irradiation light in the same direction at multiple (in FIG. 6, four) timings intermittently, the emission light is emitted from multiple different areas of the target 100. Thus, multiple (in FIG. 6, four) areas of the target 100 are marked.

The imaging device 12 images the target 100 moving relatively to the imaging device 12 at least once. The detection unit 131 detects the emission light from the image taken. In this case, since multiple areas of the target 100 are marked, multiple rays of emission light are detected from one image. Since the intensity of the emission light decays based on luminescence characteristics according to the material of the target 100, the intensity of the emission light detected by the detection unit 131 becomes gradually higher from the emission light corresponding to a past dose of irradiation to emission light corresponding to the latest dose of irradiation as shown in FIG. 6. Therefore, the tracking unit 132 can identify the multiple rays of emission light detected in one image in the chronological order based on their intensities. Thus, the tracking unit 132 can calculate the relative speed of the target 100 relative to the imaging device 12 based on the interval between the rays of emission light that are next to each other in the order of intensity.

For example, as shown in FIG. 6, when the interval between two rays of emission lights detected in one image that are next to each other in the order of intensity is X pixels and the irradiation interval in the irradiation device 11 is z seconds, the pixel relative speed Vp of the target 100 is calculated by Vp=X/z (pixel/second). Also in this case, as in the above aspect A, when the surface of the target 100 facing the imaging device 12 is a planar surface and the target 100 performs a translational motion relatively to the imaging device 12, the pixel relative speed Vp can be converted into an actual relative speed in an actual space.

In the aspect B, as the interval of the irradiation device 11 becomes shorter, the interval of rays of emission light detected in one image becomes shorter and therefore the accuracy of the calculated relative speed of the target 100 becomes higher. Also in the aspect B, as in the aspect A, the relative speed of the target 100 can be calculated regardless of the distance between the irradiation device 11 and the imaging device 12. The aspect A and the aspect B are effective, for example, when the target 100 does not change its shape or when tracking the motion of one point in the target 100 suffices, and in this case, the shorter irradiation time of the irradiation light is preferable.

FIG. 7 is a view showing a representation of an image taken by the imaging device in a case where the irradiation device radiated continuous irradiation light. In this aspect (hereinafter also referred to as an "aspect C"), an example of the case where the irradiation device 11 radiated for a predetermined length once and then stopped. Instead of this, the irradiation device 11 may radiate the irradiation light at multiple timings intermittently or radiate the irradiation light continuously without stopping.

Since the target 100 is moving relatively to the irradiation device 11, when the irradiation device 11 radiates continuous irradiation light, the emission light is emitted from an area of the target 100 having a predetermined length. Thus, in the aspect C, the target 100 is marked in a linear shape.

The imaging device 12 images the target 100 at least once. The detection unit 131 detects the emission light from the image taken. The trajectory of the detected emission light indicates the trajectory of relative movement of the target 100. Here, since the intensity of the emission light decays as the time passes, it can be seen that the area has been irradiated more recently when the intensity of the detected emission light is higher, and that the area has been irradiated farther back in time when the intensity of the emission light is lower. Therefore, the tracking unit 132 can measure the moving trajectory of the target 100 relative to the irradiation device 11 based on the trajectory of the emission light and the intensity of the emission light that are detected from one image. In the aspect C, the longer the irradiation time of the irradiation light, the larger the area of the trajectory that emits the emission light and therefore the larger the amount of information per image that can be obtained from the trajectory of the target.

The emission light is emitted based on the luminescence characteristics according to the material of the target 100. Therefore, the control device 13 may store the luminescence characteristics of the emission light of the target 100 or the same material as the target 100 in advance, and calculate the relative speed of the target 100 based on a comparison between the stored luminescence characteristics and the detected luminescence characteristics of the emission light of the target 100. For example, the luminescence characteristics of the emission light includes decay data showing the relationship between the time that has elapsed since radiation of the irradiation light and the luminescence intensity of the emission light, the luminescence duration time of the emission light, and the rate of change in the light intensity of the emission light.

For example, when a luminescence duration time τ (s) of the emission light at a certain irradiation intensity of the irradiation light is stored in advance and the length of the trajectory of the detected emission light is X pixels, the pixel relative speed Vp of the target is calculated by $Vp=X/\tau$ (pixel/second). In the aspect C, compared with the aspect of radiating pulsed irradiation light like the aspect A and the aspect B, a finer and more continuous relative speed vector can be calculated without the restrictions of the frame rate of the imaging device 12 and the irradiation rate of the irradiation device 11.

FIG. 8A is a view showing an image taken by the imaging device immediately after irradiation light that had been radiated to a rotating target was stopped. FIG. 8B is a view showing an image taken by the imaging device 100 milliseconds after the irradiation light that had been radiated to the rotating target was stopped. Specifically, the images shown in FIG. 8A and FIG. 8B show images taken in a situation where the irradiation device 11 and the imaging device 12 were standing still and a chocolate that is one example of the target was placed on a rotary base that was rotating at an angular speed of 17.5 (rad/second) in a plane parallel to the imaging plane of the imaging device 12. In this experiment, the wavelength of the irradiation light radiated by the irradiation device 11 is 375 nm, and the irradiation time is 500 milliseconds. The imaging device 12 is a CMOS camera combined with an image intensifier having the gain set to 5.0. The resolution of the imaging device 12 is 640×480 pixels and the frame rate of imaging is 240 fps. The images shown in FIG. 8A and FIG. 8B are images obtained by performing binarization processing using a predetermined threshold value on original images taken by the imaging device 12.

As shown in FIG. 8A and FIG. 8B, each trajectory of emission light 200 emitted from the chocolate draws an arc, with the intensity decaying in a counterclockwise direction. In this experiment, the chocolate was imaged through a mirror as in FIG. 18 to be shown later, and the left and the right of the images taken are reversed. Therefore, it can be seen from the trajectory of the emission light 200 that the chocolate is rotating clockwise. When the luminescence duration time of the emission light in the chocolate is τ (second) and the rotation angle of the trajectory of the emission light is Y (rad), a relative angular speed ω of the chocolate is calculated by $\omega=Y/\tau$ (rad/second).

Thus, the technique of analyzing the trajectory of the emission light based on one image taken at a certain time of day can be used, for example, for observation within the luminescence duration time when the emission light of an area that has been irradiated at the time of start of laser irradiation remains to such an extent that it can be sufficiently observed even after decaying. On the other hand, when the laser irradiation time is longer than the luminescence duration time of the emission light, the relative angular speed w can be calculated by detecting an end point on the brighter side of the trajectory of the emission light, i.e., a point corresponding to an area that has been irradiated with the laser most recently (immediately before the end of laser irradiation), in each of two images taken at different times of day, and dividing the difference between the detected points in the angle (rad) seen from the center of rotation of the rotary base by the frame interval time (second). For example, in the case of this experiment, the time between the frames of FIG. 8A and FIG. 8B is 100 milliseconds and the difference in the angle between the end points on the brighter side in the respective images is 1.77 (rad). Therefore, the relative angular speed w is calculated as follows: $\omega=1.77/0.1=17.7$ (rad/second). Thus, it can be seen that the angular speed 17.5 (rad/seconds) of the rotary base with the chocolate placed thereon is roughly, appropriately calculated.

FIG. 9 is a flowchart of the tracking process executed by the processing system according to the present embodiment.

First, the setting unit 130 sets the irradiation conditions of the irradiation device 11 (step S10), and sets the imaging conditions of the imaging device 12 (step S11). Next, the irradiation device 11 irradiates the target 100 with the irradiation light under the set irradiation conditions (step S12).

Next, the imaging device 12 images the emission light that the target 100 itself emits in response to being irradiated with the irradiation light under the set imaging conditions (step S13). Next, the detection unit 131 detects the emission light based on the image taken (step S14). Next, the tracking unit 132 calculates the relative speed of the target 100 based on the transition or the trajectory of the detected emission light (step S15). This completes the tracking process.

In step S14, various types of image processing may be performed on the image taken as described above. For example, regarding the detection of the emission light, if the image taken includes fixed noise etc. during imaging, the emission light may be detected after the noise etc. are removed. For example, an image may be separately taken after a sufficient time has elapsed since the emission light has decayed, and the magnitude of the pixel value of fixed noise may be evaluated by obtaining the maximum value of the pixel values, and a binarized image may be created using the evaluation value as a threshold value. Since the fixed noise is excluded from the created binarized image, the center of gravity in the image of a bright area attributable to the emission light can be regarded as the center of the emission light.

As has been described above, the processing system 10 according to the present embodiment can make the emission light emitted from a predetermined area of the target itself function as a marker without attaching a physical marker to the target. Compared with the configuration of attaching a physical marker or applying a light storing substance to the target, this marking method can measure the target without changing the appearance or the shape of the target and without impairing the movability of the target. In addition, as the trouble of attaching a marker is saved, the work efficiency increases.

In the processing system 10 according to the present embodiment, a marker is given independently of the color, material, shape, and the like of the target, so that a marker can be given robustly in terms of the external appearance and the shape of the target 100. Thus, for example, even a plain white target can be measured with high accuracy.

The processing system 10 according to the present embodiment uses, as a marker, luminescence of about a few milliseconds to a few hundred milliseconds due to a light storing component that is originally contained in the whole or a part of the target. Thus, compared with when a relatively high-intensity laser is used, for example, marking can be performed without destroying the target or leaving a trace due to light alteration in the irradiation area of the target.

For example, in a configuration of projecting patterned light onto a target by a projector, the position of the patterned light shifts relatively to the target when the target moves, and therefore this patterned light cannot be used as a marker of the target. In the processing system 10 according to the present embodiment, by contrast, once marking is completed, even when the target 100 moves thereafter, the emission light keeps being emitted from the same area throughout the luminescence duration time, which makes this system applicable to tracking of a target etc.

In the configuration described in Patent Literature 2 described above, the speed of the transfer belt is calculated based on the relationship between the timing of light emission by light emission means and the timing of light reception by light receiving means, and on the distance between the light emission means and the light receiving means. In the processing system 10 according to the present embodiment, by contrast, the relative speed of the target relative to the imaging device can be calculated based on the transition of the position of the emission light, regardless of the distance between the irradiation device and the imaging device. Thus, compared with the configuration described in Patent Literature 2 described above, the processing system 10 can measure the movement of the target with greater flexibility and, for example, measure the angular speed of the target.

While in the above embodiment the case where tracking of a target is performed has been described as an example of application of the processing system 10, the processing system according to the present embodiment may be used for various other applications.

For example, the processing system 10 may be applied to an inspection system that inspects an external environment while moving at a high speed relatively to the external environment. The efficiency of sensing of an external environment using a moving body as an origin becomes higher as the moving body moves at a higher speed. However, when the moving body moves at a high speed, motion blur occurs, which makes it necessary to compensate for the relative movement of the target with high accuracy. In this respect, this processing system can calculate the angular speed of the target and thereby achieve high-accuracy, stable sensing of an external environment. Specifically, this processing system can be used for inspection of infrastructures, such as roads and trains, and for line inspection involving movement as in a factory line. In these cases, this processing system can perform inspection with high efficiency compared with conventional inspection systems.

FIG. 10 is a diagram showing functional blocks of a processing system according to a first modified example of the present embodiment. In the present and subsequent modified examples, only differences from the above-described embodiment will be described while description of common matters will be omitted. In particular, the same workings and effects produced by the same components will not be mentioned on each occasion in each embodiment.

Compared with the above-described processing system 10, a processing system 10A according to the present modified example is different in that a control device 13A further includes a modulation unit 133. For example, when a plurality of processing systems performs marking at the same time, each processing system includes the modulation unit 133 that modulates the irradiation light to identify which ray of irradiation light comes from which of the processing systems.

The modulation unit 133 may spatially modulate the irradiation light by, for example, changing a shape pattern of the irradiation light that spreads over a two-dimensional plane. When the irradiation light has a shape pattern other than a point, the emission light also assumes a shape pattern in response to the irradiation light, so that the type of the marker can be identified based on the shape pattern of the emission light. For example, the processing system 10A may further include a diffraction grating provided at an irradiation opening of the irradiation device 11 and produce linear rays of irradiation light that are inclined in various directions.

FIG. 11A and FIG. 11B are views showing images taken by the imaging device in a case where spatially modulated irradiation light was radiated to a milk carton. FIG. 12A and FIG. 12B are views showing images taken by the imaging device in a case where spatially modulated irradiation light was radiated to a sketchbook. FIG. 11A and FIG. 12A show images taken during radiation of the irradiation light, and FIG. 11B and FIG. 12B show images taken immediately after the irradiation light was stopped. These are images in a case where the frame rate of the imaging device is 120 fps and the shape of the irradiation light is a linear shape.

As shown in FIG. 11B and FIG. 12B, it can be seen that when linear rays of irradiation light are radiated, linear rays of emission light are imaged also after the irradiation light is stopped. These rays of emission light stretch along different directions, so that it is possible to identify which ray of emission light is attributable to which ray of irradiation light by detecting the stretching directions of the rays of emission light. When the shape pattern of the irradiation light is asymmetric, the direction of the target may be discerned from the direction of the shape pattern of the emission light.

The modulation unit 133 may spatially modulate the irradiation light in a dynamic manner instead of spatially modulating it in a static manner. For example, the modulation unit 133 may produce emission light in a shape pattern by radiating, while moving, point-shaped irradiation light in a shape within the luminescence duration time of the emission light. Examples of shape patterns include a linear shape, a rectangular shape, a circular shape, and a polygonal shape. Causing the target to emit rays of emission light each in a different shape pattern allows for identification of each ray of emission light.

Since the emission light becomes gradually weak as the time passes, producing emission light in a shape pattern requires the movement of the irradiation light in the shape to be completed within the luminescence duration time of the emission light corresponding to the first dose of irradiation. For example, a case will be considered where the irradiation device 11 radiates continuous irradiation light as shown in FIG. 7 to produce a linear pattern with a length q. On the assumption of a case where irradiation light having a circular shape with a radius r is radiated for a time t, the luminescence duration time of the emission light is denoted by mt and the moving speed of the irradiation light is denoted by v. To irradiate any point in this linear pattern with the irradiation light with the radius r for the time t, the moving speed v of the irradiation light needs to meet a condition: $v \leq 2r/t$ (Expression 1). Further, to radiate the length q at the moving speed v within the luminescence duration time mt, the moving speed v needs to meet a condition: $q+2r \leq vmt$ (Expression 2). From Expression 1 and Expression 2, the processing system 10A can produce a linear pattern with the length q that meets a condition: $q \leq 2(m-1)r$.

Alternatively, the modulation unit 133 may modulate the intensity of the irradiation light by changing the light radiation intensity. For example, the processing system 10A may further include a neutral density (ND) filter provided at the irradiation opening of the irradiation device 11 and change the light radiation intensity according to the light transmission rate of the ND filter. Some ND filters can change the light transmission rate by being rotated and have a characteristic that the optical density becomes linearly higher (i.e., the transmission rate becomes lower) as the rotation angle becomes larger. Therefore, the modulation unit 133 may change the intensity of the irradiation light by, for example, controlling the rotation angle of such an ND filter so as to change the light transmission rate.

FIG. 13 is a graph showing luminescence data in a case where the intensity of the irradiation light was modulated. Each of luminescence data L1 to L3 shown in this graph was obtained by irradiating a milk carton with the irradiation light for 100 ms, and represents, from an image taken by the imaging device 12, the pixel value of a pixel at a center coordinate of an area having been irradiated with the irradiation light. The luminescence data L1 is a result of a case where no ND filter was provided. The luminescence data L2 is a result of a case where the ND filter was rotated 90 degrees (i.e., the transmission rate was about 30%). The luminescence data L3 is a result of a case where the ND filter was rotated 180 degrees (i.e., the transmission rate was a few percent). Here, a phenomenon that the pixel value saturates at about 1000 between the 13th and the 20th image frames can be recognized. It should be noted that this phenomenon is due to a measurement problem that the luminescence intensity of the emission light exceeded the dynamic range of the CMOS image sensor and therefore is not an essential phenomenon. The imaging device 12 is a CMOS camera combined with an image intensifier with the gain set to 5.0. Imaging is not performed from the 10th to the 11th frames as they correspond to a time when the irradiation light is radiated, and the pixel values in the 11th and the 12th frames and the subsequent frames correspond to those of the emission light.

FIG. 14A and FIG. 14B are views showing parts of images taken under conditions corresponding to the luminescence data L1 of FIG. 13. FIG. 15A and FIG. 15B are views showing parts of images taken under conditions corresponding to the luminescence data L2 of FIG. 13. FIG. 16A and FIG. 16B are views showing parts of images taken under conditions corresponding to the luminescence data L3 of FIG. 13. FIG. 14A, FIG. 15A, and FIG. 16A each show an image taken immediately after the irradiation light was stopped (the 11th frame in FIG. 13), and FIG. 14B, FIG. 15B, and FIG. 16B each show an image taken 100 ms after the irradiation light was stopped (the 22nd frame in FIG. 13).

From the graph shown in FIG. 13, it can be seen that the higher the intensity of the irradiation light is, the higher the pixel value at the same time of day is. Therefore, it can be said that modulating the intensity of the irradiation light can make the emission light identifiable.

Other than the above-described modulation methods, the modulation unit 133 may modulate the irradiation light by a modulation method, such as time modulation of changing the irradiation period of the irradiation light, wavelength modulation of changing the spectrum of the irradiation light, or pulse-code modulation of modulating the irradiation light into pulses. In the case of pulse-code modulation, to secure a contrast ratio of the emission light to be imaged, it is preferable that pulses be shot with the decay time of the emission light taken into account. For example, it is preferable that a condition be applied, such as that the next dose of irradiation light is radiated when the level of the emission light has decreased by a predetermined ratio from a maximum value based on a decay curve of the emission light obtained in advance.

In each of these modulation methods, rays of irradiation light modulated so as to differ from one another are radiated and rays of emission light based on the modulated rays of irradiation light are imaged by the imaging unit. Thus, it is possible to identify which marker detected by the detection unit was given by which of the processing systems. Each processing system may include, on an upstream side of the imaging unit, a filter that selectively passes emission light based on modulated irradiation light. Alternatively, modulation methods may be used in combination such that, for example, the irradiation light is spatially modulated as well as temporally modulated.

When the irradiation device of one processing system gives a marker multiple times, rays of irradiation light radiated multiple times may be modulated so as to differ from one another. In this case, even when the imaging unit images a plurality of markers at the same time, it is possible to identify which detected marker was given at which time.

FIG. 17 is a diagram showing functional blocks of a processing system according to a second modified example of the present embodiment.

Compared with the above-described processing system 10, a processing system 10B according to the present modified example is different in that the irradiation device 11 irradiates the target 100 with irradiation light that spreads over a two-dimensional plane and that a control device 13B further includes a matching unit 134.

The irradiation light radiated by the irradiation device 11 is patterned light in a random pattern that spreads over a two-dimensional plane facing the target 100. When such irradiation light is radiated, emission light is emitted from an area in a random pattern of the target 100. Thus, in the processing system 10A, the target 100 is marked in a random pattern.

The imaging device 12 images, at multiple timings, the emission light in a random pattern emitted from the target 100 itself. The imaging device 12 has such an angle of view that it can image at least part of the emission light in a random pattern.

The matching unit 134 performs pattern matching using a plurality of images taken by the imaging device 12. Thus, the processing system 10B can measure the relative position, the relative posture, etc. of the target in the images.

As is conventionally known, an artificial method such as attaching a physical marker or applying a light storing substance to a target can have difficulty in giving a marker in a random pattern. In this respect, the processing system 10B can cause the target to emit the emission light in accordance with the pattern of the irradiation light, and therefore can easily give a marker in a random pattern. Performing pattern matching using a marker in a random pattern can achieve high accuracy in pattern matching compared with, for example, a configuration of using a marker in a pattern that follows a predetermined rule. However, it is not intended to limit the pattern of the irradiation light to a random pattern, and the irradiation light may have various other patterns.

FIG. 18 is a diagram showing an example of the configuration of a processing system according to a third modified example of the present embodiment.

Compared with the processing system 10, a processing system 10C further includes mirrors 14, 15 as shown in FIG. 18. In FIG. 18, the control device 13 is not shown.

The mirror 14 is one specific example of an optical path control unit that guides the emission light emitted from the target 100 toward the imaging device 12. The mirror 15 is one specific example of an optical path control unit that guides the irradiation light radiated from the irradiation device 11 to any area of the target 100.

The mirrors 14, 15 may be, for example, fixed mirrors, or may be uniaxial or biaxial galvanometer mirrors of which the operation is controlled by the control device 13. In FIG. 18, as one example, an example in which the mirror 14 is a fixed mirror and the mirror 15 is a galvanometer mirror is shown. By using a galvanometer mirror as the mirror 15, the processing system 10C can control the radiation direction of the irradiation light at a higher speed than by moving the irradiation device 11 itself. Therefore, it is easy to continuously irradiate a specific area of the target 100 with the irradiation light, even when the target 100 moves relatively to the irradiation device 11. Further, it is easy to give a marker to the target, even when the target is of a small size or the surface of the target poses restrictions on irradiation.

When the processing system 10C is used and the irradiation device 11 radiates irradiation light intermittently at intervals shorter than the luminescence duration time of the emission light, for example, a new dose of irradiation light may be radiated so as to overlap with the emission light corresponding to a preceding dose of irradiation, before this emission light disappears. Specifically, the tracking unit 132 of the control device 13 calculates the relative position and the relative speed of the emission light emitted from the target 100, and based on the calculated relative position and the relative speed of the emission light, calculates the position to be irradiated with the next dose of irradiation light. The control device 13 controls the mirror 15 such that the irradiation light is radiated to the calculated position. Thus, a new ray of emission light is superposed on a ray of emission light corresponding to the preceding dose of irradiation, so that a temporally uninterrupted emission light can be emitted from a predetermined area of the target. In other words, the marker can last longer than the luminescence duration time of the emission light.

In calculating the position to be irradiated with the next dose of irradiation light, if the irradiation position shifts from the preceding irradiation position due to a delay in each of steps, including the imaging step by the imaging device 12, the image processing step by the control device 13, the step of controlling the mirror 15, and the step of radiating the irradiation light, the control device 13 may calculate the position to be irradiated with these delays taken into account.

Both the mirrors 14, 15 need not necessarily be included, and only one of them may be included. Alternatively, one of the mirrors may function both to control the optical path of the irradiation light from the irradiation device 11 and to control the optical path of imaging of the imaging device 12.

While the processing systems 10, 10A to 10C according to the present embodiment have been described above, the above-described embodiment and modified examples are merely specific examples of the present invention, to which the present invention is not limited. For example, in the above-described embodiment and modified examples, the example in which fluorescence or phosphorescence is emitted from the target using a light storing phenomenon has been shown. However, the emission light emitted from the target is not limited to fluorescence or phosphorescence, and may instead be, for example, infrared light generated by thermal excitation. In this case, the imaging device may be a thermography that can image infrared light. Also in this aspect, the emission light is emitted due to a temperature rise phenomenon in the target, independently of the external appearance and the shape of the target, so that a marker can be given to the target robustly in terms of the external appearance and the shape thereof, as in the above-described embodiment.

The embodiment having been described above is to help understand the present invention and not to restrictively interpret the present invention. The elements included in the embodiment and their arrangement, materials, conditions, shapes, sizes, etc. are not limited to those illustrated but can be changed as necessary. In addition, some components shown in different embodiments can be exchanged or combined with each other.

REFERENCE SIGNS LIST

10, 10A to 10C Processing system
11 Irradiation device
12 Imaging device
13, 13A, 13B Control device
14, 15 Mirror
20 CPU
21 RAM
22 ROM
23 Communication unit
24 Input unit
25 Display unit
100 Target
110 Irradiation unit
120 Imaging unit
130 Setting unit
131 Detection unit
132 Tracking unit
133 Modulation unit
134 Matching unit
200 Emission light

The invention claimed is:

1. A processing system comprising:

an irradiator source that irradiates a target with irradiation light;

a camera that images emission light that the target itself emits in response to being irradiated with the irradiation light;

a detector that detects the emission light as a marker of the target based on an image taken by the camera;

a matcher comprising a processor and memory storing instructions that, when executed by the processor, cause the processor to perform a matching of the marker in each image detected by the detector, wherein:

the irradiation light includes patterned light in a random pattern that spreads over a two-dimensional plane;

the camera images, at multiple timings, the emission light in a random pattern emitted from the target itself in response to the irradiation light; and the matcher performs the matching of the marker in a random pattern based on multiple images taken at the multiple timings.

2. The processing system according to claim 1, wherein the irradiator source irradiates the target with the irradiation light intermittently at intervals shorter than a luminescence duration time of the emission light.

3. The processing system according to claim 2, comprising a tracker that tracks the target based on the marker detected by the detector, wherein the irradiator source irradiates an area of the target with the irradiation light based on a position of the target tracked by the tracker.

4. The processing system according to claim 1, further comprising a modulation unit that modulates the irradiation light, wherein the camera images the emission light based on the modulated irradiation light to allow the marker detected by the detector to be identified.

5. The processing system according to claim 1, further comprising an optical path control unit that guides irradiation light radiated from the irradiator source to any area of the target.

6. The processing system according to claim 1, wherein the camera includes a high-speed camera that images the emission light at a frame rate of 100 fps or higher.

7. The processing system according to claim 1, wherein the camera images the emission light that is emitted from the target itself after irradiation of the target with the irradiation light is stopped.

8. The processing system according to claim 1, wherein the emission light includes delayed fluorescence or phosphorescence emitted from the target after being irradiated with the irradiation light.

9. A marking method comprising:

irradiating a target with irradiation light;

imaging emission light that the target itself emits in response to being irradiated with the irradiation light;

detecting the emission light as a marker of the target based on an image taken;

matching a marker in each image detected by a detector, wherein:

the irradiation light comprises patterned light in a random pattern that spreads over a two-dimensional plane;

the imaging images, at multiple timings, the emission light in a random pattern emitted from the target itself in response to the irradiation light, and the matching performs the matching of the marker in a random pattern based on multiple images taken at the multiple timings.

10. The marker detected in the marking method according to claim 9.

11. A non-transitory computer-readable medium storing a marking program that, when executed by a computer, causes the computer to:

control irradiation of a target with irradiation light;

acquire images of emission light that the target itself emits in response to being irradiated with the irradiation light;

detect the emission light as a marker of the target based on the acquired images;

perform matching of the marker in each of the images, wherein:

the irradiation light comprises patterned light in a random pattern that spreads over a two-dimensional plane;

the images are acquired at multiple timings, and include emission light in a random pattern emitted from the target itself in response to the irradiation light; and the matching includes matching of the marker in a random pattern based on the images acquired at the multiple timings.

* * * * *